Patented Nov. 16, 1937

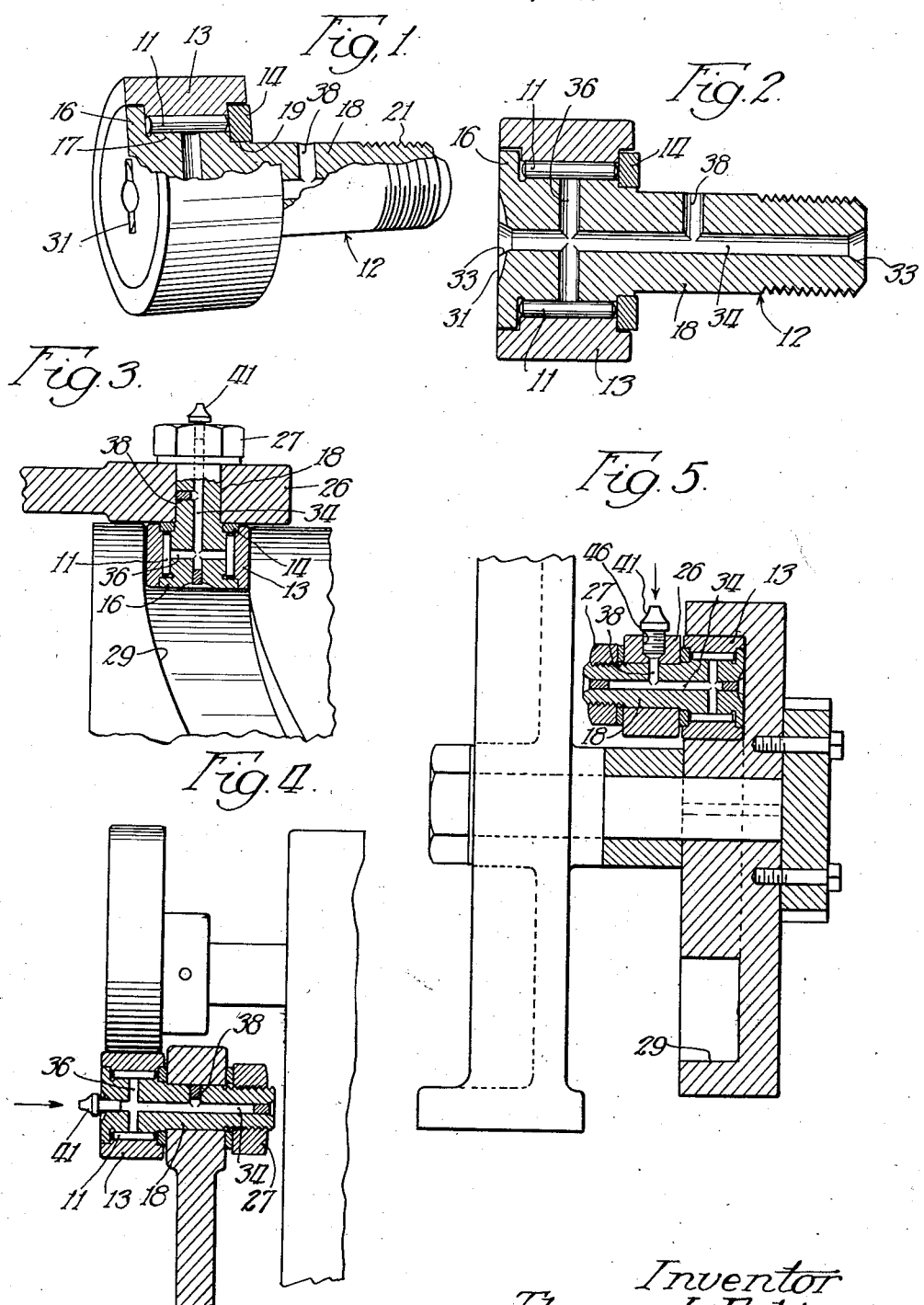

2,099,660

UNITED STATES PATENT OFFICE 2,099,660

BEARING

Thomas L. Robinson, Valparaiso, Ind., assignor to McGill Manufacturing Company, Valparaiso, Ind., a corporation of Indiana Application November 21, 1936, Serial No. 112,064

2 Claims. (Cl. 74—569)

This invention relates in general to anti-friction bearings, and more particularly to cam followers embodying roller bearings.

In its illustrated form, the cam follower is extremely simple, with the result that its cost of manufacture and assembly is relatively low. Besides the anti-friction rollers, the follower includes only three pieces, the inner bearing member which forms the stud, the outer bearing member which forms the relatively rotatable follower called the roller, and the retaining ring.

It is of course necessary to make provisions for lubricating the bearings of such cam followers. This has caused inconvenience in the past because of the fact that when cam followers are used in different relationships with their associated machinery, different points of the follower are accessible and must be used for lubrication. Sometimes it may be one end or the other of the bearing stud, and sometimes it may be a central position of the bearing stud. Since these cam followers must be of an extremely hard metal, which is difficult to tool, it has often been customary to provide three sets of followers, each having its lubricating outlet at a different point. According to the present invention a stud is provided for universal applicability, having its lubricating channel provided with three lubricating openings at the three different points which may have to be used. The openings which are not desired can very easily be plugged. Furthermore, the arm of the channel which communicates with the bearing rollers is extended to have an outlet on both sides of the bearing hub to facilitate the cleaning of this opening after carbonizing the stud.

One object of the invention is to provide a cam follower of more universal applicability than those heretofore known, particularly in being easily adapted for lubrication at different points.

Another object of the invention is to provide a cam follower, preferably a universally applicable cam follower, in a form which can be manufactured more economically. To this end the centering indentations are formed at the ends of the longitudinal lubricating channel, a screw driver slot is formed in the head of the stud, and a single retaining ring is used, being driven onto a slightly raised shoulder so that it will not mar the shank of the stud as it is being driven into position for cooperating to form the roller bearing raceway.

Other objects and advantages will be apparent from the following description and from the drawing, in which:

Fig. 1 is a perspective view of the assembled cam follower partly broken away to show its construction.

Fig. 2 is a longitudinal sectional view of the structure shown in Fig. 1.

Figs. 3, 4 and 5 are views showing the cam follower used in three different relations with its associated machinery and lubricated in a different manner in each instance.

Although only one form of the invention has been chosen for illustration, together with different arrangements for lubrication, it should be understood that the invention may take various other forms. In its basic form, illustrated in Figs. 1 and 2, the bearing includes only three parts besides the bearing rollers 11, and this is of course very desirable from the standpoint of simplicity. The other parts are the stud 12, the roller 13, and the retaining ring 14. The stud 12 is shaped to include a head 16, a raceway hub 17, a shank 18, a slightly enlarged shoulder 19 thereon, and a threaded end 21. In assembling the cam follower it is merely necessary to slip the stud through the follower roller 13, insert the bearing rollers and press or drive the retaining ring 14 onto the shoulder 19. Because the shoulder 19 is of slightly larger diameter than the shank 18, the collar 14 will not scratch the shank 18, though it must be expanded slightly to pass onto shoulder 19.

As seen in Figs. 3, 4 and 5, the cam follower may be secured to the lever arm 26 by inserting its shank through said arm and screwing a nut 27 onto the threaded end 21 of the stud. The nut 27 may be screwed home, forcing the lever arm 26 firmly against the ring 14.

The ring 14 is preferably slightly thicker than the shoulder 19 so as to provide a tolerance to avoid any danger that the lever arm 26 will engage the shoulder 19 rather than bearing against the surface of the ring 14. Likewise the ring 14 is thicker than the annular notch which is provided for it in the cam roller 13 so as to insure spacing of the roller 13 from the lever arm 26. The head 16 of the stud 12 is preferably flush with the rim of the cam roller 13 so that the roller may fit into a cam groove 29, as seen in Fig. 3. To facilitate screwing the nut 27 onto the stud, a screw driver slot 31 may be provided in the head 16.

In the course of forming or machining the stud 12, one or more centering indentations 33 may be formed. According to the present invention, a longitudinal lubricating channel 34 is drilled through the stud 12 as a continuation of these indentations 33. A radial channel 36 is drilled through the hub to communicate with the channel 34. This radial channel 36 preferably passes entirely through the hub diametrically so that any foreign matter caught therein as a result of carbonizing or other hardening treatment or finishing may be cleaned out easily.

An additional radial duct 38 is also provided at approximately the center of the smooth shank portion 18. All of these ducts are drilled into the stud 12 before it is hardened and, if desired, they may have both ends of the duct 34 enlarged and threaded before hardening, to receive lubricating nipples, although lubricating nipples 41 small enough to fit into the normal sized duct (Figs. 3 and 4) have been successfully mounted in an end of a duct in a press fit. Lubrication may also be accomplished by merely squirting lubricating oil in the ordinary manner into the duct which is accessible as described hereinafter.

A supply of identical cam followers may be kept on hand for sale for any one of various uses, such as those shown in Figs. 3 to 5. If the cam follower is to be used as shown in Fig. 3, the lubricating nipple 41 will be attached to the stud as seen in Fig. 3, and the head end of the duct 34 will be plugged up as will be the duct 38. The plug may comprise any relatively soft metal driven into the ducts or, if the duct has been threaded, it may be a screw plug. With the arrangement in Fig. 3, it is obvious that lubrication injected through the nipple 41 will be forced to the roller bearing through the channels 34 and 36.

In Fig. 4 the head end of the stud 12 is accessible rather than the other end, and hence the nipple 41 is applied to this end, the duct 38 and the far end of the duct 34 being plugged as shown.

In Fig. 5 neither end of the cam follower is accessible in the mechanism to which it is applied, and therefore the duct 38 is used, both ends of the duct 34 being plugged. In this instance a duct 46 is provided in the lever arm 26 and the nipple 41 is applied thereto. The duct 46 may be alined with the duct 38, when the cam follower is applied to the follower arm 26, and tightened in this position by the nut 27; or the duct 46 may extend annularly around the shank 18 for some distance so as to more easily communicate with the duct 38.

From the foregoing it is seen that a very simple cam follower is provided which may readily be adapted for use in different relations with its associated machinery and to provide adequate lubricating facilities in each relation. Furthermore, it is seen that the cam follower is of such nature that its costs will be relatively low. To prevent shifting of the stud within the follower arm, it is of course desirable that the shank 18 fit snugly within the opening provided in the arm. To this end it is important that the shank should not be scraped or scratched by the retaining ring 14, and such scraping is avoided by providing a low shoulder 19 at the hub end of the shank 18.

The disclosures of this application are illustrative, and the invention is not to be limited by them. In fact, if modifications or improvements are not at once obvious, they may be devised in the course of time to make additional use of the broad ideas taught and covered by this application. The claims are intended to point out novel features and not to limit the invention except as may be required by prior art.

I claim:

1. A cam follower including a stud having as integral portions a circular head plate, a hub portion, and a threaded shank portion; a roller ring carried by said hub portion and rotatable with respect thereto having a counterbore at each side thereof with said head-plate in one of said counter-bores, a spacing and retaining collar frictionally and rigidly secured on said shank substantially at the juncture of the hub portion and shank portion of said stud and lying in the other of said counter-bores, with said collar wider than said other counter-bore, and roller bearings between said hub portion and said roller retained against movement axially of said follower by said stud head plate and said retaining collar.

2. A cam follower including a stud having as integral portions a circular head plate, a hub portion, and a threaded shank portion; a roller ring carried by said hub portion and rotatable with respect thereto having a counter-bore at each side thereof with said head-plate in one of said counter-bores, a spacing and retaining collar frictionally and rigidly secured on said shank substantially at the juncture of the hub portion and shank portion of said stud and lying in the other of said counter-bores, with said collar wider than said other counter-bore, and roller bearings between said hub portion and said roller retained against movement axially of said follower by said stud head plate and said retaining collar, said head plate having a screw driver slot on the outside thereof, and a lubricating duct extending from the center of said slot axially into said stud, with said hub portion having a radial lubricating duct in communication with said axial duct for lubricating said roller bearings from said axial duct.

THOMAS L. ROBINSON.